(No Model.) 3 Sheets—Sheet 1.
A. H. HULL.
AUTOMATIC CHECK ROW CORN PLANTER.
No. 442,682. Patented Dec. 16, 1890.
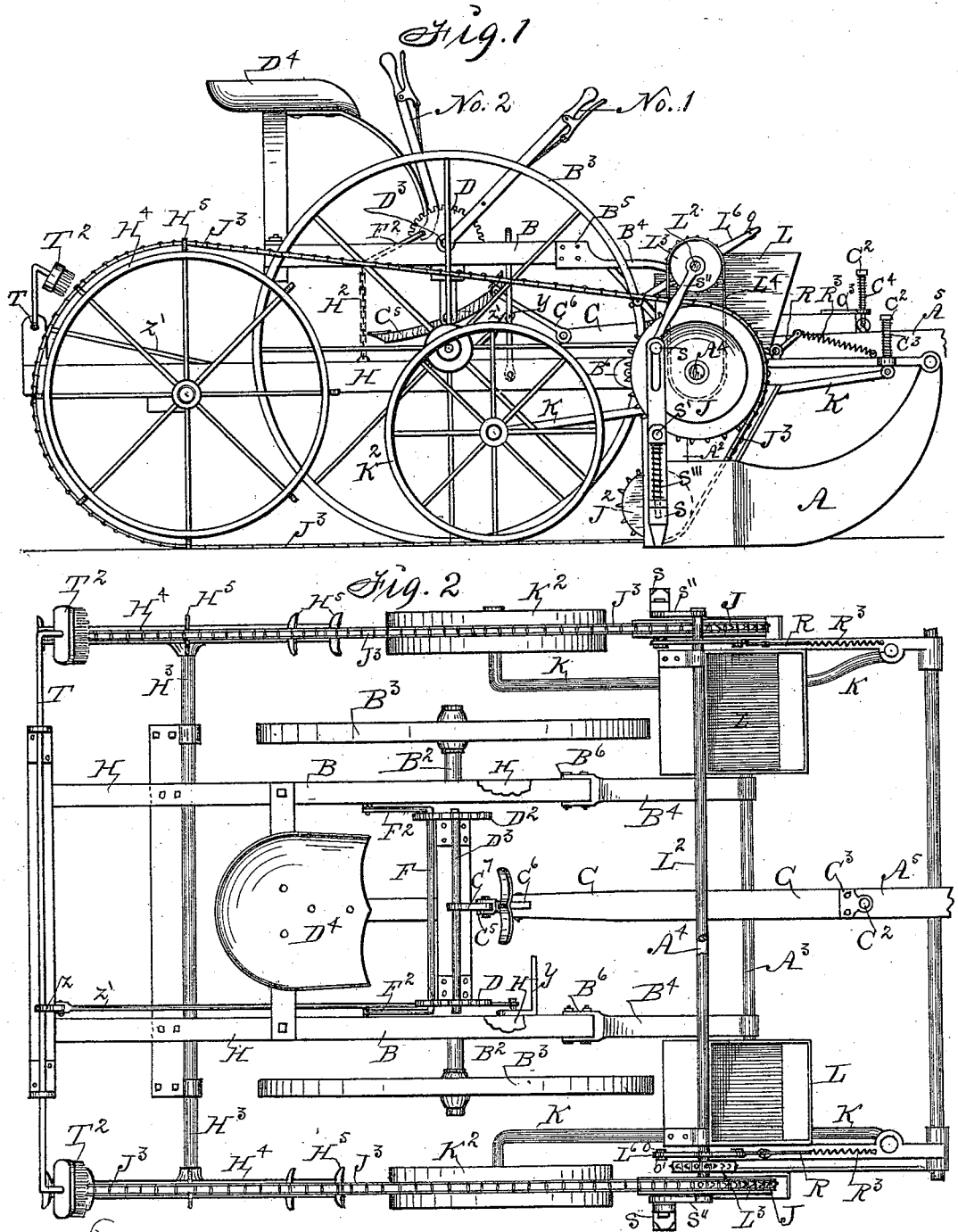
Witnesses:
M. P. Smith.
R. H. Orwig.
Inventor:
Abijah H. Hull,
By Thomas G. Orwig, Attorney.

(No Model.) 3 Sheets—Sheet 2.
A. H. HULL.
AUTOMATIC CHECK ROW CORN PLANTER.
No. 442,682. Patented Dec. 16, 1890.
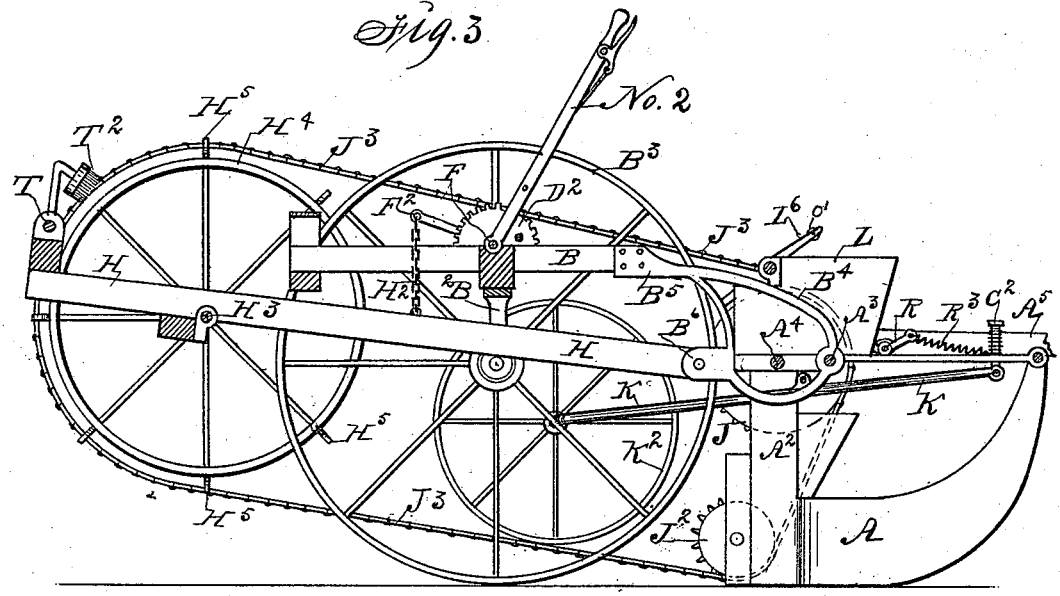
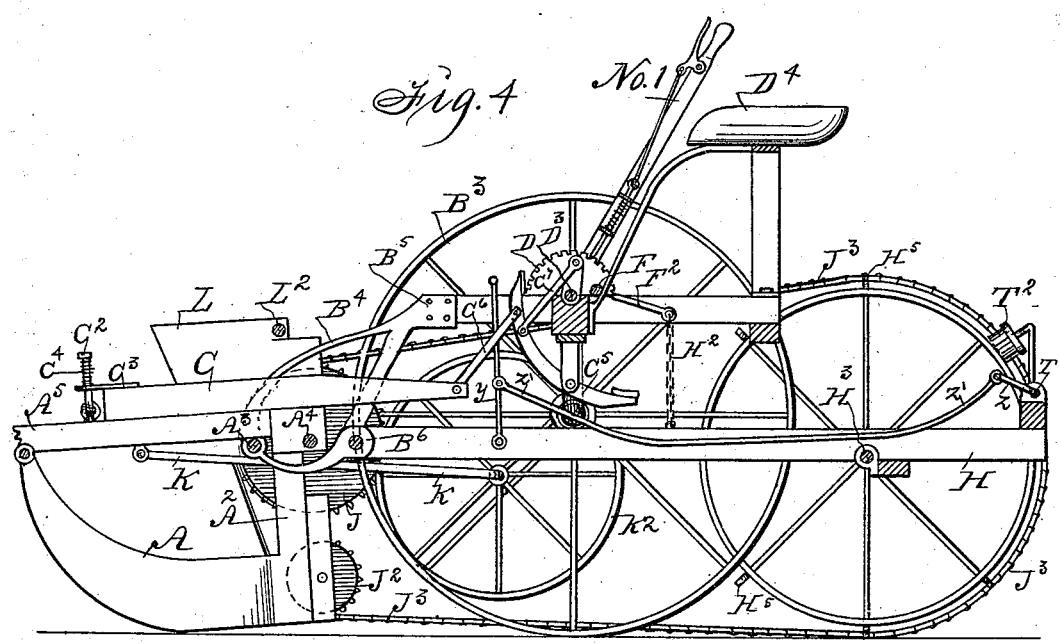
Witnesses:
R. H. Orwig.
M. P. Smith.
Inventor
Abijah H. Hull,
By Thomas G. Orwig, Attorney.

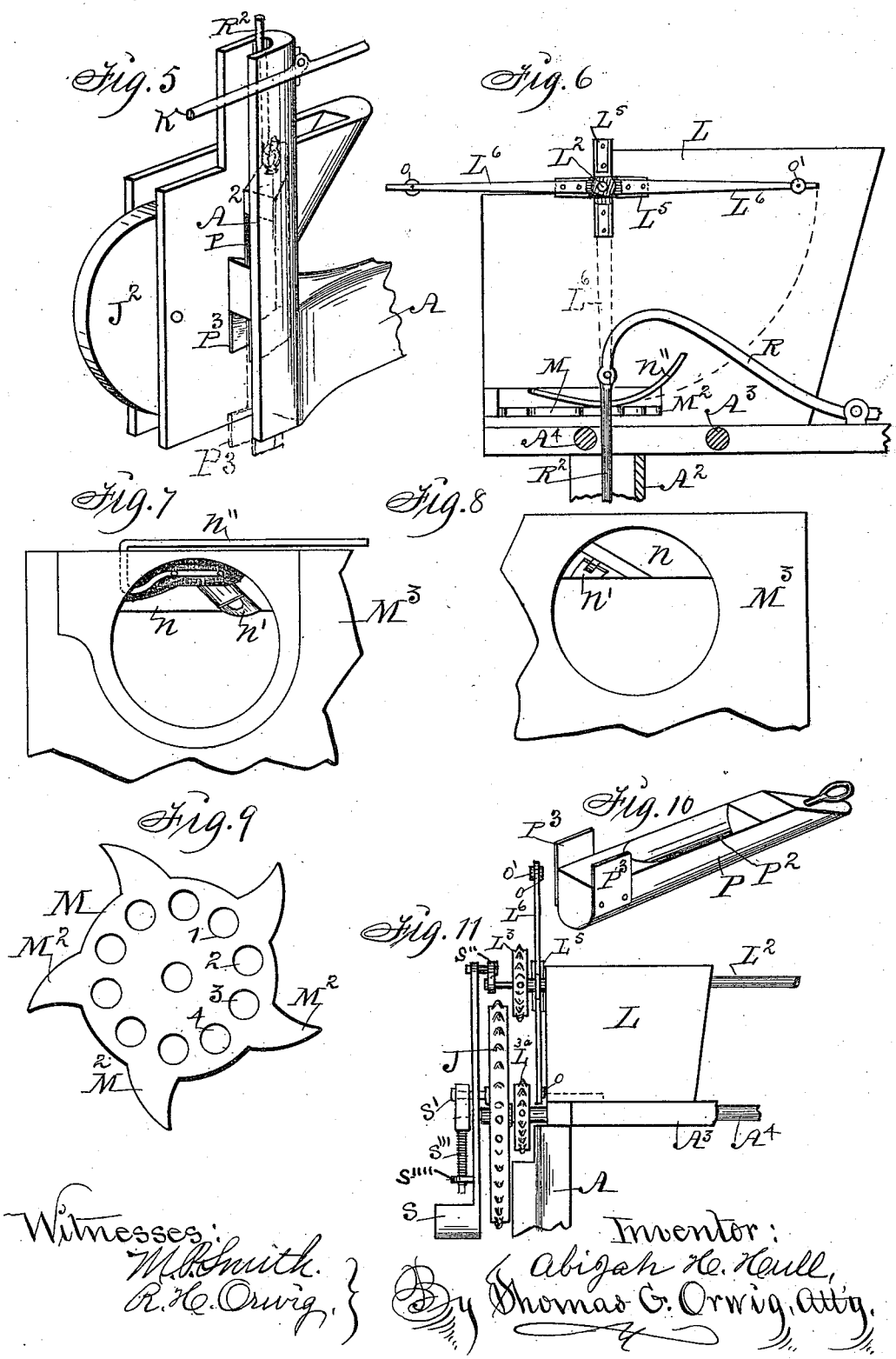

UNITED STATES PATENT OFFICE.

ABIJAH H. HULL, OF ODEBOLT, IOWA.

AUTOMATIC CHECK-ROW CORN-PLANTER.

SPECIFICATION forming part of Letters Patent No. 442,682, dated December 16, 1890.

Application filed April 14, 1890. Serial No. 347,742. (No model.)

*To all whom it may concern:*

Be it known that I, ABIJAH H. HULL, a citizen of the United States of America, and a resident of Odebolt, in the county of Sac and State of Iowa, have invented an Automatic Check-Row Corn-Planter, of which the following is a specification.

My object is to provide a machine adapted to be operated on a light or heavy, wet or dry, fine or coarse ground, and even or uneven surface, to simultaneously drop in parallel rows any number of seed desired at regular intervals of space and mark the ground as required to produce uniform check-rows, and also prepare the ground to favor the growth of the plants.

My invention consists in the construction, arrangement, and combination of novel elements and sub-combinations with a tractable carriage, as hereinafter set forth, pointed out in my claims, and illustrated in the accompanying drawings, in which—

Figure 1 is a side view, and Fig. 2 a top view, of the complete machine. Fig. 3 is a vertical and longitudinal section of the machine, showing the mechanism for raising and lowering the chain-carrying wheels and chains; and Fig. 4 is a corresponding view, showing the mechanism for raising and lowering the heels of the runners. Fig. 5 is an enlarged perspective view of the heel of a runner having an integral tubular standard and an integral chamber for a sprocket or other wheel and chain, showing the position of the seed-cup in the standard and the cover of the rear open side of the standard removed. Fig. 6 is a side view of a seed-box and seed-dropping mechanism combined therewith. Fig. 7 is a bottom view, and Fig. 8 a top view, of the detachable bottom of the seed-box, having an opening for the dropping of seeds and a device for regulating the number of seeds contained therein. Fig. 9 is a top view of a rotating seed-dropping disk having integral cams on its periphery and adapted to be journaled to the fixed bottom of the seed-box and under the opening in the removable bottom. Fig. 10 is a perspective view of a seed-carrying plunger-block adapted to be operated in the tubular standard as required to deposit seeds in the furrow and to prevent ground from adhering to the heel of the runner. Fig. 11 is a detail view showing the seed-dropping and marking mechanism connected with a seed-box mounted on the standard and runner of the front carriage.

A are the runners, and $A^2$ the tubular standards. The front ends of the runners are rigidly connected by means of a cross-bar, and the top ends of the standards are also rigidly connected by means of a rod or bar $A^3$ and a rotating shaft $A^4$ as required to produce the front carriage-frame, to which a pole $A^5$ is fixed.

B is the frame of the rear carriage, supported upon an arched axle $B^2$ and traction-wheels $B^3$ and hinged to the rod $A^3$ of the front carriage by means of coupling-irons $B^4$, as clearly shown in Fig. 3, in such manner that the heels of the runners can be raised and lowered. The couplings $B^4$ are preferably cast and adapted in shape to be hinged to the front carriage and rigidly fixed to the side pieces of the rear carriage and hinged to the side pieces of the frame of an auxiliary carriage. They are therefore of skeleton form to admit and encircle the shaft $A^4$ and provided at their front and lower ends with bearings to admit the rod $A^3$, to which they are hinged. At their top ends they have rear extensions $B^5$, adapted to be fixed to the front ends of the side bars of the rear carriage, and at their lower portions they have perforated ears or sockets $B^6$, adapted to admit the front ends of the side pieces of an auxiliary carriage-frame as required to produce a hinged connection.

C is an extension of the pole $A^5$ and has a hinged connection that allows it to overlap the rear part of the pole and to change its inclination relative to the pole.

$C^2$ is a post hinged to the pole-extension C by means of an eyebolt or in any suitable way to project up through a perforated plate $C^3$, fixed to the front end of the extension.

$C^4$ is a coiled spring placed on the post and fastened at its top in such a manner that it will in its normal condition press the front end of the extension down upon the pole. A flexible connection is thus produced that allows the pole-extension to adjust itself relative to the motions of the front and rear carriages and to prevent jarring and concussion.

$C^5$ is a curved bar or treadle hinged to the under side and center of the axle B² to project forward and backward therefrom. It has cross-pieces adapted to serve as foot-rests formed on or fixed to its ends. The front end of the treadle is connected with the rear end of the pole-extension C by means of a link C⁶ and with the arm of a rock-shaft by a link C⁷ in such a manner that the rear end of the pole-extension can be raised and lowered by the operation of the rock-shaft.

D and D² are racks of semicircular shape fixed to the central parts of the side bars of the frame B.

D³ is a rock-shaft in bearings formed in the racks or otherwise made and fixed to the frame.

1 is a hand-lever fixed to the end of the rock-shaft D³ and provided with a spring-actuated bolt or latch that engages the rack D as required to lock the shaft and to retain the rear end of the pole-extension and the heels of the runners at any point of elevation desired. Pulling the lever backward lifts the pole-extension and the runners and bearing it forward depresses them, and when the operator on the seat D⁴, mounted on the frame B, places his feet on the treadle the operations will be facilitated and his weight utilized in effecting the up-and-down adjustments of the runners.

F is a rock-shaft in parallel position with the shaft D³ and in bearings formed in the racks D and D². It has arms F², projecting rearward, and a hand-lever 2, projecting upward, and a latch connected with the lever to engage the rack D² as required to lock the lever and rock-shaft to retain the auxiliary frame elevated whenever desired.

H are the side bars of the auxiliary frame, hinged at their front ends to the projections B⁶ of the metal couplings B⁴ and connected at their central parts with arms F² of the rock-shaft F by chains H², as clearly shown in Fig. 3.

H³ is a rotating axle in bearings fixed to the rear part of the auxiliary frame, and H⁴ are chain-carrying wheels fixed to the ends of the axle and provided with fixed chain-supports H⁵, that project radially from their peripheries. These chain-bearers also project laterally relative to the rims of the wheels to allow a chain to slide thereon and have extensions at their corners that prevent the chain from slipping off.

Heretofore chain-bearers have extended radially from the rim of a wheel; but my manner of widening the bearers to allow a chain to slide laterally relative to the wheel and providing projections at the corners to prevent the chain from slipping off as it slips from one side to the other is novel and essential in the operation of my machine.

J are sprocket-wheels fixed to the ends of the rotating shaft A⁴, and J² are sprocket-wheels of smaller diameter in the chambers formed therefor in the heels of the runners. J³ are endless measuring-chains placed over these sprocket-wheels connected with the runners and the wheels H⁴, carried by the auxiliary frame H, in such a manner that the measuring-chains will be laid in the furrows and covered when the machine is advanced in a field as required to produce sufficient friction to rotate the shaft A⁴, and thereby actuate the seed-dropping and marking mechanism at regular intervals of space. The chains also stir the ground as the machine is advanced and leave it loose over the planted seed.

K are wheel-bearing bars pivoted to the inside and top portions of the standards A², as clearly shown in Fig. 3, and flexibly connected at their front ends with the front carriage in the same manner that the front end of the pole-extension C is connected with the pole A⁵. Their rear ends have stub-axles formed on or fixed thereto to project outward to support wide-rimmed wheels K², that are adapted to close the furrow made by the runners and to cover the seeds dropped therein, and also to cover the measuring-chains J³ and to press the ground upon them as required to produce friction on the chains. The same motion of the lever 1 that depresses the heels of the runners also depresses the wheels K². It is therefore obvious that the heels of the runners and the said wheels can be simultaneously operated, depressed, or elevated by the person on the seat to regulate the depth of furrows and the friction of the measuring-chains necessary to actuate the seed-dropping and marking devices simultaneously and uniformly as required to plant seeds at regular intervals of space. If there is any gain in space, the friction of the measuring-chains must be increased by pressing the lever 1 forward.

L are seed-boxes fixed on top of the standards A², and L² is a rotating shaft in bearings fixed to the top and rear portions of the boxes. L³ is a sprocket-wheel fixed to the end portion of the shaft L² and connected with a corresponding wheel L³ᵃ on or fixed to the inside face of the wheel J or shaft A⁴ by means of a chain L⁴, as shown in Figs. 1 and 11, and as required to transmit motion from the wheel J or shaft A⁴ to the shaft L².

L⁵ are winged hubs on the end portions of the shaft L², and L⁶ are arms detachably fixed to the wings by means of bolts to project radially and equidistant from each other. Any number of arms may be thus attached for the purpose of transmitting motion from the shaft L² to the seed-dropping devices combined with the seed-boxes and the runners at regular intervals.

M are perforated disks journaled on the tops of the fixed bottoms of the seed-boxes in such a manner that the cams M² on their peripheries will project horizontally outward through slots formed in the side walls of the boxes, so that the ends of the arms L⁶ will successively come into contact therewith as required to impart rotary motion to the disks at regular intervals. The number of perforations in the disk will control the number of seeds dropped through the disk at each partial rotation thereof. Each perforation is adapted in size to admit a single grain of corn at a time, and as the perforations are brought to coincide with an elongated and curved slot in the fixed bottom of each box the seeds in the perforations of the disk will drop through said slots and fall into seed-cups in the tubular standards. It is therefore obvious that the number of seeds to be planted in each hill can be governed by interchangeable disks that have different numbers of perforations and the number of arms $L^6$, that successively engage the cams on the said disks, increased to correspond. The diameters or sizes of the wheels J regulate the intervals of space between the points where the seeds are planted in the ground. Each revolution of said wheels actuates the seed-dropping and the marking mechanism simultaneously.

$M^3$ are removable bottoms placed over the rotating disks, preferably through the open tops of the boxes, and supported in such a manner that they will allow the disks to rotate underneath. Each removable bottom has a circular opening and a block $n$ fixed in each opening in such a manner that it will cover the open slot in the fixed bottom underneath. A spring-actuated lip or cut-off $n'$, hinged to each block, serves as a guard to prevent more than one seed being carried under the block in each perforation.

$n''$ is the seed-ejector, and is also a disk-holding detent, and consists of a metal rod pivoted at its central portion to the auxiliary bottom or otherwise and bent in such a manner that the outer arm is extended forward and curved upward on the outside of the seed-box as required to be engaged by studs or anti-friction rollers on the arms $L^6$ of the shaft $L^2$, as shown in Fig. 6, and the inner arm is extended forward within a chamber in the under side of block $n$, as shown in Fig. 7. On a downward bend at the end of the inner arm are one or more pins fixed thereto to project downward, and so they will when the seed-ejector is at rest in its normal position extend into the perforations in the rotating disk M as required to free the disk from any seed adhering therein and to retain the disks stationary. Studs or anti-friction rollers $o$, projecting inward from each arm $L^6$, will at each revolution of the arm come in contact with the under side of the curved outer arm of the seed-ejector $n''$ to lift it and to thereby free the disk from the pin or pins projecting down from the inner arm as required to allow the arm $L^6$ to rotate the disk and to drop seeds from its perforations, and as quick as the arm $L^6$ is free from contact with the cam on the disk the seed-ejector $n''$ will by force of gravity resume its normal position, clear the perforations of seed, and latch fast to the disk as required to retain the disk stationary until the seed-dropping actions of the seed-ejector and disk is to be repeated by the movement of another arm $L^6$. Seeds are thus successively dropped from the seed-boxes during the intermittent rotary motions of the disks to fall into seed-cups, from whence they will be simultaneously dropped into open furrows at the heels of the runners. It is obvious that the pins that project downward from the inner arm of the seed-ejector will be free from contact with the perforated rotating disk M when the outer arm of the seed-ejector is elevated by means of the anti-friction rollers on the arms $L^6$, so that the disk can rotate as required to carry seeds under the block $n$, fixed to the auxiliary bottom $M^3$. It is also obvious that when the seed-ejector resumes its normal position the pins projecting downward from its inner arm must necessarily enter perforations in the rotating disk M when said perforations are brought into coinciding positions with said pins, so that the said ejector by force of gravity will cause the pins to enter said perforations to aid in freeing seeds therefrom that may be retained therein, and also arrest the motion of the rotating disk.

Each tubular standard $A^2$ has a sliding block P fitted therein, and each block has a seed-cup $P^2$ in its face, as clearly shown in Fig. 10. These sliding blocks are pressed downward at regular intervals to deposit the seeds carried in their cups by means of curved levers R, pivoted to the front carriage-frame, as shown in Fig. 6, in such a manner that they will extend rearward at the sides of the seed-boxes to be engaged by studs or anti-friction rollers $o'$, projecting outward from one of the arms $L^6$, at each revolution of the shaft $L^2$ as required to be depressed. The rear ends and long arms of the levers R being connected with the blocks P by means of links or rods $R^2$, they will therefore push the blocks down toward the ground and forcibly eject the seeds carried therein into the furrows. Springs $R^3$, connected with the ends of the short arms of the levers R, will in their normal condition retain the seed-carrying blocks elevated, and when the blocks are pressed down power will be stored in the springs to raise the blocks when the downward pressure upon them is relaxed. By removing the blocks P the seeds can be dropped singly to the ground at regular intervals, as in drill-planting.

$P^3$ are metal plates fixed to the blocks P to project horizontally in such a manner that they will scrape the inside faces of the hollow heels of the runners as they move up and down therein, and in so doing will prevent the dirt from adhering and clogging the openings through which the seeds are discharged.

S are markers connected with the circumferences of the wheels J by means of bolts $s'$ in such a manner that the markers will be carried in vertical positions and parallel to each other while the wheels rotate. The bolts are fixed to the wheels and project outward through longitudinal slots or bridles in the central portions of the markers, that allow the markers to rise and descend as the wheels rotate. Arms $s''$ on the ends of the shaft $L^2$ are connected with the top ends of the markers in such a manner that they will retain the markers upright while the wheels J and the shaft $L^2$ rotate in concert with each other. Coil-springs $s'''$, placed under the bolts $s'$ and on top of the lugs $s''''$, projecting from the lower portions of the markers in their normal condition, press the markers downward continually, so that the markers will every time they are brought into line with the axle of the wheel mark the ground whenever the seeds are deposited, and the springs will allow the markers to rise when the markers strike unyielding objects. The springs $s'''$ are guided by pins that extend from the bolts $s'$ downward through perforations in the lugs $s''''$.

T is a rock-shaft in bearings fixed to the rear end of the frame H. It has arms projecting from its ends and brushes $T^2$ on the ends of the arms, adapted to engage and clean the endless chains $J^3$ when the machine is in motion.

$y$ is a lever pivoted to the front portion of the frame H within reach of the operator on the seat and connected with an arm $z$ on the shaft T by means of a rod $z'$ in such a manner that the brushes can be pressed upon the chains whenever necessary.

From the foregoing description of the construction and function of each element and sub-combination in the machine the unitary actions of all the operative parts and the practical operation and utility of my complete invention will be obvious to persons familiar with the art to which it pertains.

I claim as my invention—

1. In a corn-planter, a rotating shaft in bearings fixed to the top and rear portion of each standard of the front carriage, sprocket-wheels fixed to the ends of the shaft, a smaller wheel or chain-directing pulley journaled to the heel portion of each runner, an auxiliary carriage hinged to the front carriage to extend rearward to support a rotating axle having chain-bearing wheels fixed to its ends, endless chains placed over the sprocket-wheels and directing-pulleys at the sides of the front carriage and over the wheels on the rotating axle carried by the auxiliary carriage, and levers pivoted to the front carriage, having wheels on their rear ends to engage the chains, a lever fulcrumed to the rear carriage and connected with the front carriage, and a lever fulcrumed to the rear carriage and connected with the auxiliary carriage, arranged and combined to operate in the manner set forth, for the purposes stated.

2. The wheels J and $J^2$ on the front carriage, the chain-carrying wheels $H^4$ on an auxiliary carriage hinged to the front carriage, chains $J^3$, placed on said wheels J, $J^2$, and $H^4$, levers K, covering-wheels $K^2$, a lever 1, fulcrumed to the rear carriage and connected with an extension at the rear end of the pole $A^5$, and the lever 2, fulcrumed to the rear carriage and connected with the frame of the auxiliary carriage, arranged and combined substantially as shown and described, to operate in the manner set forth, for the purposes stated.

3. The combination of a pole-extension flexibly connected with the rear end of the pole of the front carriage of a corn-planter, a rock-shaft in bearings fixed to the rear carriage hinged to the front carriage, a lever projecting up from the rock-shaft, a treadle linked to an arm on the rock-shaft and also linked to the rear end of the pole-extension, levers connected with the front carriage to extend rearward, and wheels carried on the ends of said levers to be raised and lowered by the operation of the lever on the rock-shaft, in the manner set forth, for the purposes stated.

4. The pole-extension C, hinged to the rear end of the pole $A^5$, the fixed plate $C^3$ on the front end of the said extension, the post $C^2$, the spring $C^4$, the rock-shaft $D^3$, having fixed lever 1 in bearings fixed to the rear carriage, and the links $C^6$ and $C^7$, arranged and combined to operate in the manner set forth, for the purposes stated.

5. The skeleton coupling-irons $B^4$, having rear extensions $B^5$ and $B^6$ and bearings in their front portions, in combination with the side bars B of the rear carriage, the side bars H of the auxiliary frame, and the bar $A^3$ of the front carriage, in the manner set forth, for the purposes stated.

6. A chain-carrying wheel having bearers projecting radially from its periphery, said bearers widened at their free ends and provided with projections at their corners and adapted to allow a chain to move laterally on the wheel, in the manner set forth, for the purposes stated.

7. A runner having an integral tubular standard with an integral chamber to inclose and protect a sprocket-wheel or pulley at its lower end and a chain on said pulley, for the purposes stated.

8. The combination of a runner A, having a tubular standard $A^2$, a wheel or pulley $J^2$, and a vertically-moving seed-carrying block P, for the purposes stated.

9. The block P, having a seed-cup $P^2$ and projections $P^3$, in combination with the tubular standard $A^2$ and the heel of a runner, for the purposes stated.

10. In a seed-box having a rotating seed-disk and an auxiliary bottom placed over the rotating seed-disk, the combination of a seed-ejector having an arm outside of the the seed-box and an arm to extend through the chamber in the under side of the block fixed in the side of the opening in the auxiliary bottom, said inside arm provided with one or more pins projecting downward to engage the seed-disk to clear the seed-cups in the seed-disk from any seed adhering therein and adapted to retain the seed-disk stationary when required, in the manner shown, and for the purposes stated.

11. The combination of the disk M, having integral cams $M^2$ and a series of perforations in its circumference, the fixed bottom of the seed-box, an auxiliary bottom $M^3$, having a circular opening, a block $n$, fixed in said opening, and a guard $n'$, attached to the block, and the seed-ejector $n''$, to operate in the manner set forth, for the purposes stated.

12. The combination of the rotating shaft $L^2$, having winged hubs $L^5$ on its end portions, and arms $L^6$, fixed to said hubs and provided with studs or anti-friction rollers $o$, with the seed-boxes L, the seed-ejector $n''$, and the disks M, having cams $M^2$, to operate in the manner set forth, for the purposes stated.

13. The combination of the spring-actuated levers R, the seed-boxes, the seed-carrying blocks in the tubular standards, and the arms projecting from the shaft $L^2$ for depressing the levers at regular intervals for the purpose of discharging seeds into the furrows opened by the advance of the runners.

14. The rotating shaft $L^2$, carrying fixed arms $L^6$ and studs or anti-friction rollers $o'$, projecting laterally from said arms, in combination with the lever R and seed-carrying blocks in the tubular standards, to operate in the manner set forth, for the purposes stated.

15. The combination of the rotating shaft having fixed arms projecting radially and anti-friction rollers or studs extending laterally from the end portions of said arms, with levers pivoted at the sides of seed-boxes, and seed-carrying boxes or blocks having a sliding connection with tubular standards and the heels of runners, to operate in the manner set forth, for the purposes stated.

16. The levers R, the links or rods $R^2$, and the springs $R^3$, in combination with the blocks P in the standards $A^2$, for the purposes stated.

17. In combination with the front carriage, the markers pivoted to the wheels on the ends of a rotating shaft and to the arms on the ends of a second rotating shaft in such a manner, said wheels and arms revolving in concert, that the markers will be retained in an upright position, descending to and rising from the point on the ground to be marked without moving along the ground while in contact therewith, substantially as shown, and for the purposes stated.

18. The markers $s$, having bridles at their centers and top ends, in combination with wheels J, the arms $s''$ of the rotating shaft $L^2$, and springs $s'''$, to operate in the manner set forth.

19. The rock-shaft T, carrying brushes $T^2$ on its ends and having an arm $z$, in combination with a lever $y$, pivoted to the side bar H of the auxiliary frame carrying the wheels $H^4$, to operate in the manner set forth, for the purposes stated.

20. In a corn-planter, the combination of an endless chain with a runner and wheels for supporting the chain and laying the chain in the furrow made by the runner to produce friction on the chain and to stir the ground, in the manner set forth, for the purposes stated.

ABIJAH H. HULL.

Witnesses:
R. H. ORWIG,
THOMAS G. ORWIG.